US012198886B2

(12) United States Patent
Yuan et al.

(10) Patent No.: US 12,198,886 B2
(45) Date of Patent: Jan. 14, 2025

(54) PASSIVE TRIGGERED-POWER ELECTRONIC TAP-CHANGER DEVICE AND CONTACT DEVICE

(71) Applicants: ELECTRIC POWER RESEARCH INSTITUTE. CHINA SOUTHERN POWER GRID, Guangdong (CN); SHANGHAI HUAMING POWER EQUIPMENT CO., LTD., Shanghai (CN)

(72) Inventors: Yao Yuan, Guangdong (CN); Yi Xiao, Shanghai (CN); Xi Zhang, Guangdong (CN); Qiang Zhu, Shanghai (CN); Zongming He, Shanghai (CN); Shuaibing Wang, Guangdong (CN); Lianwei Bao, Guangdong (CN); Jiahui Yang, Guangdong (CN); Wenhao Li, Guangdong (CN); Linjie Zhao, Guangdong (CN); Ruihai Li, Guangdong (CN)

(73) Assignees: ELECTRIC POWER RESEARCH INSTITUTE. CHINA SOUTHERN POWER GRID, Guangdong (CN); SHANGHAI HUAMING POWER EQUIPMENT CO., LTD., Shanghai (CN)

( * ) Notice: Subject to any disclaimer, the term of this patent is extended or adjusted under 35 U.S.C. 154(b) by 260 days.

(21) Appl. No.: 18/010,228

(22) PCT Filed: May 6, 2021

(86) PCT No.: PCT/CN2021/091943
§ 371 (c)(1),
(2) Date: Dec. 14, 2022

(87) PCT Pub. No.: WO2022/001362
PCT Pub. Date: Jan. 6, 2022

(65) Prior Publication Data

US 2023/0230780 A1 Jul. 20, 2023

(30) Foreign Application Priority Data

Jun. 29, 2020 (CN) ......................... 202010601233.2
Feb. 8, 2021 (CN) ......................... 202110170877.5

(51) Int. Cl.
*H01H 9/00* (2006.01)
*H01H 19/12* (2006.01)

(52) U.S. Cl.
CPC ........ *H01H 9/0016* (2013.01); *H01H 9/0027* (2013.01); *H01H 19/12* (2013.01)

(58) Field of Classification Search
CPC .. H01H 9/0005; H01H 9/0011; H01H 9/0016; H01H 9/0027; H01H 9/0033;
(Continued)

(56) References Cited

U.S. PATENT DOCUMENTS

| | | | | |
|---|---|---|---|---|
| 3,651,375 | A * | 3/1972 | Ebersohl | H02H 7/055 361/13 |
| 5,617,091 | A * | 4/1997 | Uda | H03M 1/682 341/154 |
| 2020/0043650 | A1 * | 2/2020 | Eguchi | H01H 9/0016 |

FOREIGN PATENT DOCUMENTS

| | | | |
|---|---|---|---|
| CN | 2342452 | Y | 10/1999 |
| CN | 2896468 | Y | 5/2007 |

(Continued)

OTHER PUBLICATIONS

Li Xiaoming; Liao Qingfen; Yin Xianggen; Xie Jianghui; "A new on-load tap changing system with power electronic elements for power transformers"; Dec. 10, 2002; IEEE; Proceedings. International Conference on Power System Technology (Year: 2002).*

(Continued)

*Primary Examiner* — Thienvu V Tran
*Assistant Examiner* — Shahzeb K Ahmad
(74) *Attorney, Agent, or Firm* — Yue (Robert) Xu; Apex Attorneys at Law, LLP

(57) ABSTRACT

Disclosed are a passive triggered-power electronic tap-changer device and a contact device. The power electronic
(Continued)

tap-changer device comprises: two taps, a main contact, two auxiliary contacts, two trigger contacts, an output terminal, two thyristors, and four voltage divider resistors, which can achieve the passive triggering of a power electronic switch by means of controlling the auxiliary contacts and the trigger contacts. Provided in the present invention is a contact device for the passive triggered-power electronic tap-changer, comprising: at least two stationary contacts, a main contact, two thyristor trigger contacts, two thyristor auxiliary contacts, and a drive shaft, wherein the main contact, the thyristor trigger contacts, and the thyristor auxiliary contacts are fixed to the drive shaft, the contact device can switch the power electronic switch to different stationary contacts by means of controlling the rotation of the drive shaft, and maintains the switching time sequence of passive triggering.

10 Claims, 8 Drawing Sheets

(58) Field of Classification Search
CPC . H01H 2009/0061; H02P 13/00; H02P 13/06; H01F 29/02; H01F 29/04; H01F 29/25; H02M 1/32
See application file for complete search history.

(56) References Cited

FOREIGN PATENT DOCUMENTS

| | | | | | |
|---|---|---|---|---|---|
| CN | 101430967 | A | | 5/2009 | |
| CN | 201259825 | Y | * | 6/2009 | ........... H01H 9/0005 |
| CN | 102208265 | A | | 10/2011 | |
| CN | 103019284 | A | | 4/2013 | |
| CN | 103189948 | A | | 7/2013 | |
| CN | 203119860 | U | | 8/2013 | |
| CN | 104283536 | A | | 1/2015 | |
| CN | 105161274 | A | | 12/2015 | |
| CN | 105206402 | A | | 12/2015 | |
| CN | 205069346 | U | * | 3/2016 | |
| CN | 205751825 | U | * | 11/2016 | |
| CN | 207381234 | U | | 5/2018 | |
| CN | 207458782 | U | | 6/2018 | |
| CN | 207833270 | U | | 9/2018 | |
| CN | 108768359 | A | | 11/2018 | |
| CN | 210073649 | U | | 2/2020 | |
| CN | 111899999 | A | | 11/2020 | |
| CN | 112151289 | A | | 12/2020 | |
| CN | 113035603 | A | | 6/2021 | |
| DE | 102010019948 | B4 | * | 6/2015 | ............... G05F 1/14 |
| JP | 3997584 | B2 | | 10/2007 | |

OTHER PUBLICATIONS

The 1st Office Action mailed on May 28, 2021 regarding the Chinese priority patent application No. CN202010601233.2.
Shi Xuntao et al, Characteristics and Experimental Study of Thyristors Applied to On-Load Tap-Changers, Southern Power System Technology, vol. 13, No. 4, Apr. 20, 2019, pp. 67-72.
Michael A. Novikov et al, Experimental research of multiple switching in a thyristor controlled phase shifter, «2015 16th International Conference of Young Specialists on Micro/Nanotechnologies and Electron Devices» ,Dec. 31, 2015.
International Search Report for PCT/CN2021/091943 mailed Jul. 26, 2021, ISA/CN.

* cited by examiner

PASSIVE TRIGGERED-POWER ELECTRONIC TAP-CHANGER DEVICE AND CONTACT DEVICE

This application is the national phase of International Patent Application No. PCT/CN2021/091943, titled "PASSIVE TRIGGERED-POWER ELECTRONIC TAP-CHANGER DEVICE AND CONTACT DEVICE", filed on May 6, 2021, which claims priority to Chinese Patent Application No. 202010601233.2, titled "POWER ELECTRONIC TAP CHANGER DEVICE AND DISTRIBUTION TRANSFORMER", filed on Jun. 29, 2020 with the Chinese Patent Office and Chinese Patent Application No. 202110170877.5, titled "CONTACT DEVICE FOR PASSIVE TRIGGERED POWER ELECTRONIC TAP CHANGER", filed on Feb. 8, 2021 with the Chinese Patent Office, all of which are incorporated herein by reference in their entireties.

FIELD

The present disclosure relates to the technical field of electronic switches, in particular to a passive triggered power electronic tap changer device and a contact device.

BACKGROUND

At present, for an on load tap changer used for a distribution transformer, a hybrid solution is adopted in which a mechanical switch and a thyristor operate in coordination. According to the hybrid solution, in case of normal operation, a mechanical contact carries the current; and only in case of switching process, a power electronic device operates to carry the current in the switching process to avoid generating an arc.

However, the main technical problem of the conventional hybrid power electronic tap changer solution is how to perform passive triggering on a power electronic switch. With the passive triggering, it is unnecessary for external triggering circuits and devices, improving reliability and reducing cost. According to the conventional technology, active triggering is usually performed for which it is required to configure external triggering circuits and devices, resulting in high circuit cost.

SUMMARY

According to the embodiments of the present disclosure, a passive triggered power electronic tap changer device and a contact device are provided to perform passive triggering on a tap changer in a switching process, achieving a simple implementation, a simple structure and a high reliability.

To achieve the above purpose, a power electronic tap changer device is provided according to an embodiment of the present disclosure. The power electronic tap changer device includes: a first tap, a second tap, a main contact, a first auxiliary contact, a second auxiliary contact, a first trigger contact, a second trigger contact, an output terminal, a first thyristor, a second thyristor, a first resistor, a second resistor, a third resistor and a fourth resistor. The main contact, the first auxiliary contact, the second auxiliary contact, the first trigger contact and the second trigger contact are respectively connected to a first static contact of the first tap or a second static contact of the second tap. The main contact is connected to the output terminal. The first auxiliary contact is connected to a terminal of the first thyristor, and the output terminal is connected to another terminal of the first thyristor. The second auxiliary contact is connected to a terminal of the second thyristor, and the output terminal is connected to another terminal of the second thyristor. The first trigger contact is connected to a first terminal of the first resistor, a second terminal of the first resistor is connected to a first terminal of the second resistor, and the output terminal is connected to a second terminal of the second resistor. The second trigger contact is connected to a first terminal of the third resistor, and a second terminal of the third resistor is connected to a first terminal of the fourth resistor, and the output terminal is connected to a second terminal of the fourth resistor.

In an improved embodiment, the power electronic tap changer device further includes a fifth resistor. The second thyristor is connected to a first terminal of the fifth resistor, and the output terminal is connected to a second terminal of the fifth resistor.

In an improved embodiment, in a case that the power electronic tap changer device operates normally, the main contact, the first auxiliary contact, the second auxiliary contact, the first trigger contact and the second trigger contact are all connected to the first static contact.

In an improved embodiment, in a case that the power electronic tap changer device starts to perform switching, the main contact, the first auxiliary contact, the second auxiliary contact, the first trigger contact and the second trigger contact are controlled to be disconnected from the first static contact and be connected to the second static contact based on a predetermined switching control strategy.

In an improved embodiment, the switching control strategy includes: disconnecting the main contact from the first static contact; disconnecting the first trigger contact from the first static contact; disconnecting the first auxiliary contact from the first static contact, and connecting the first auxiliary contact to the second static contact; connecting the first trigger contact to the second static contact; disconnecting the second trigger contact from the first static contact; connecting the main contact to the second static contact; disconnecting the second auxiliary contact from the first static contact, and connecting the second auxiliary contact to the second static contact; and connecting the second trigger contact to the second static contact.

In an improved embodiment, the first tap is adjacent to the second tap.

To achieve the above purpose, a distribution transformer is further provided according to an embodiment of the present disclosure. The distribution transformer includes the power electronic tap changer device according to any one of the above embodiments.

Compared to the conventional technology, with the power electronic tap changer device and the distribution transformer according to the present disclosure, passive triggering is performed on thyristors in the switching process of the tap changer, increasing circuit reliability and reducing the cost.

According to another embodiment of the present disclosure, a contact device for a passive triggered power electronic tap changer is provided. The contact device is applicable for the power electronic tap changer device according to the above embodiments. The contact device includes: at least two static contacts, a main contact, two thyristor trigger contacts, two thyristor auxiliary contacts, and a drive shaft. The at least two static contacts are arc-shaped conductive sheets with a same radius, and are distributed on a circumference with the drive shaft as a center to form a cylindrical structure around the drive shaft. The main contact, the two thyristor trigger contacts and the two thyristor auxiliary contacts are connected to the drive shaft to rotate with the drive shaft, and are in sliding contact with the static contact. The two thyristor trigger contacts is configured to rotate in a same rotation track, and the two thyristor auxiliary contacts is configured to rotate in a same rotation track. Each of the at least two static contacts includes: a first part contacting the main contact, a second part contacting the two thyristor trigger contacts, and a third part contacting the two thyristor auxiliary contacts. The first part is less than the second part in length, and the second part is less than the third part in length. The first part, the second part and the third part of each of the at least two static contacts are distributed on the circumference with the drive shaft as the center. An initial position of the main contact is located between an edge line of a first part of a first static contact and a center line of the first static contact, where the first static contact is one of the at least two static contacts, a distance between the main contact and a first edge line closest to the main contact is a first distance, the first edge line is located at an edge of the first part and the edge is parallel to the center line of the first static contact. Initial positions of the two thyristor trigger contacts are symmetrically distributed on two sides of a center line of a second part of the first static contact, where a distance between one of the two thyristor trigger contacts and a second edge line closest to the thyristor trigger contact is a second distance, the second edge line is located at an edge of the second part and the edge is parallel to the center line of the second part. Initial positions of the two thyristor auxiliary contacts are symmetrically distributed on two sides of a center line of a third part of the first static contact, where a distance between one of the two thyristor auxiliary contacts and a third edge line closest to the thyristor auxiliary contact is a third distance, the third edge line is located at an edge of the third part and the edge is parallel to the center line of the third part. The first distance is less than the second distance, and the second distance is less than the third distance.

In a preferred embodiment, the first part of the first static contact, the second part of the first static contact and the third part of the first static contact are connected at a same potential.

In a preferred embodiment, the main contact, the two thyristor trigger contacts and the two thyristor auxiliary contacts are configured to rotate around the drive shaft at a same angular speed.

In a preferred embodiment, a maximum contact area between the main contact and the first static contact is greater than a maximum contact area between each of the thyristor auxiliary contacts and the first static contact, and the maximum contact area between each of the thyristor auxiliary contacts and the first static contact is greater than a maximum contact area between each of the thyristor trigger contacts and the first static contact.

The contact device for a passive triggered power electronic tap changer according to the embodiments of the present disclosure includes: at least two static contacts, a main contact, two thyristor trigger contacts, two thyristor auxiliary contacts, and a drive shaft. The at least two static contacts are distributed on a circumference with the drive shaft as a center. The main contact, the two thyristor trigger contacts and the two thyristor auxiliary contacts are connected to the drive shaft, and contact different parts of the at least two static contacts along with the drive shaft. The main contact contacts a first part of a static contact, the thyristor trigger contacts contact a second part of the static contact, and the thyristor auxiliary contacts contact a third part of the static contact. The lengths of the three parts are configured, so that the main contact, the two thyristor trigger contacts and the two thyristor auxiliary contacts rotate under the drive of the drive shaft to respectively contact different parts of different static contacts. With the contact device, it is controlled to switch to perform passive triggering on the power electronic tap changer with the rotation of the drive shaft, realizing a stable switching process which is easy to be controlled and reducing the device cost.

According to the present disclosure, a passive triggered power electronic tap changer device and a contact device are provided. The power electronic tap changer device includes: two taps, a main contact, two auxiliary contacts, two trigger contacts, an output terminal, two thyristors, and four voltage dividing resistors. The auxiliary contacts and the trigger contacts are controlled, so that passive triggering is performed on the power electronic tap changer, increasing circuit reliability and reducing the cost. According to the present disclosure, a contact device for a power electronic tap changer is provided. The contact device for a power electronic tap changer includes: at least two static contacts, a main contact, two thyristor trigger contacts, two thyristor auxiliary contacts and a drive shaft. The main contact, the thyristor trigger contacts and the thyristor auxiliary contacts are fixed on the drive shaft. With the contact device, the power electronic tap changer is controlled to switch to different static contacts with the rotation of the drive shaft, and the switching sequence of passive triggering is maintained, realizing a stable switching process which is easy to be controlled and reducing the device cost.

DETAILED DESCRIPTION

The technical solutions according to the embodiments of the present disclosure will be described clearly and completely hereinafter with reference to the accompanying drawings in the embodiments of the present disclosure. Apparently, the described embodiments are only part of the embodiments according to the present disclosure, rather than all of the embodiments. All the other embodiments obtained by those skilled in the art based on the embodiments of the present disclosure without creative efforts fall within the protection scope of the present disclosure.

Figure 1:
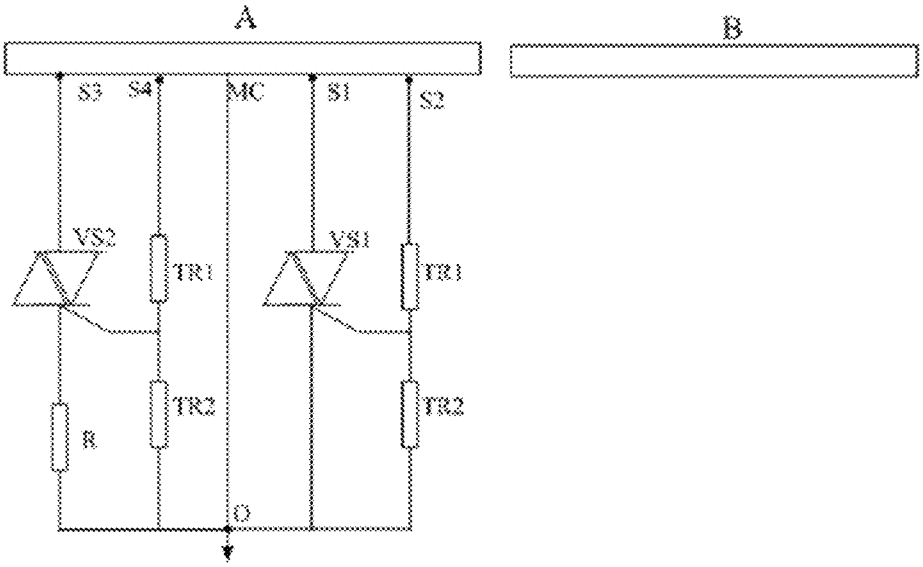
FIG. 1 is a schematic structural diagram of a power electronic tap changer device according to an embodiment of the present disclosure.

A power electronic tap changer device is provided according to an embodiment of the present disclosure. Reference is made to FIG. 1, which is a schematic structural diagram of a power electronic tap changer device according to an embodiment of the present disclosure. The power electronic tap changer device includes: a first tap, a second tap, a main contact MC, a first auxiliary contact S1, a second auxiliary contact S3, a first trigger contact S2, a second trigger contact S4, an output terminal O, a first thyristor VS1, a second thyristor VS2, a first resistor TR1, a second resistor TR2, a third resistor TR3 and a fourth resistor TR4.

The first tap is adjacent to the second tap. The main contact MC, the first auxiliary contact S1, the second auxiliary contact S3, the first trigger contact S2 and the second trigger contact S4 are respectively connected to a first static contact A of the first tap or a second static contact B of the second tap. The main contact MC is connected to the output terminal O. The first auxiliary contact S1 is connected to a terminal of the first thyristor VS1, and the output terminal O is connected to another terminal of the first thyristor VS1. The second auxiliary contact S3 is connected to a terminal of the second thyristor VS2, and the output terminal O is connected to another terminal of the second thyristor VS2. The first trigger contact S2 is connected to a first terminal of the first resistor TR1, a second terminal of the first resistor TR1 is connected to a first terminal of the second resistor TR2, and the output terminal O is connected to a second terminal of the second resistor TR2. The second trigger contact S4 is connected to a first terminal of the third resistor TR3, a second terminal of the third resistor TR3 is connected to a first terminal of the fourth resistor TR4, and the output terminal O is connected to a second terminal of the fourth resistor TR4.

In an embodiment, the power electronic tap changer device further includes a fifth resistor TR5. The second thyristor VS2 is connected to a first terminal of the fifth resistor TR5, and the output terminal O is connected to a second terminal of the fifth resistor TR5.

In an embodiment, the first resistor TR1, the second resistor TR2, the third resistor TR3 and the fourth resistor TR4 are triggering resistors, and the fifth resistor TR5 is a transition resistor.

Specifically, in a case that the power electronic tap changer device operates normally, the main contact MC contacts the first static contact A to carry current, and S1, S2, S3, and S4 are connected to the first static contact A through mechanical switches. Before the tap changer performs switching, A, MC and O are at a same potential, two terminals of the thyristors VS1 and VS2 are short circuited, and there is no triggering current, thus the thyristors VS1 and VS2 are not to be turned on. In a case that the tap changer starts to perform switching, the main contact MC is controlled, by a controller, to be disconnected from the first static contact A before S1, S2, S3, and S4. In this case, since the contacts S1, S2, S3, and S4 are still connected to the first static contact A, a potential difference is generated between each of the two terminals of the thyristors VS1 and VS2, and the potential difference is a voltage of a tap of a distribution transformer. Due to the potential difference, a voltage drop is generated between two terminals of the thyristors VS1 and VS2, and then a triggering current may be provided for the thyristors VS1 and VS2 based on voltage division by triggering resistors, thereby performing passive conduction on the thyristors VS1 and VS2.

Figure 2:
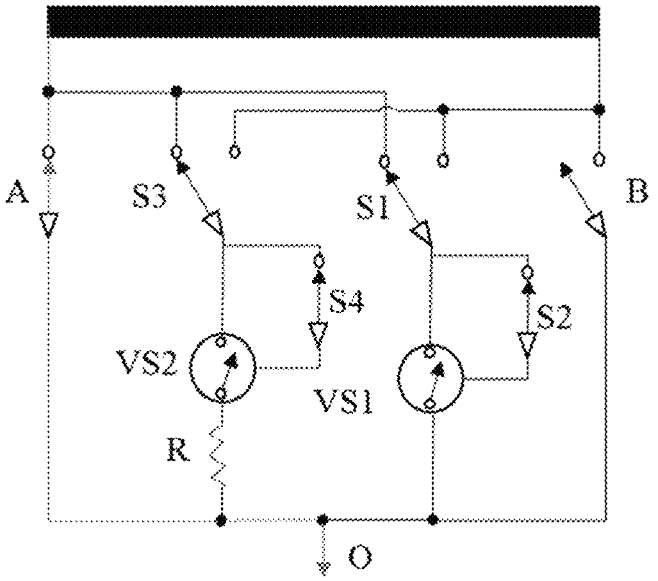
FIG. 2 is a circuit diagram of a power electronic tap changer device according to a first embodiment of the present disclosure.

Specifically, referring to FIG. 2, in a case that the power electronic tap changer device operates normally, the main contact MC, the first auxiliary contact S1, the second auxiliary contact S3, both the first trigger contact S2 and the second trigger contact S4 are all connected to the first static contact A.

Specifically, in a case that the power electronic tap changer device starts to perform switching, the main contact MC, the first auxiliary contact S1, the second auxiliary contact S3, the first trigger contact S2 and the second trigger contact S4 are controlled to be disconnected from the first static contact A and be connected to the second static contact B based on a predetermined switching control strategy.

In an embodiment, the switching control strategy includes the following steps S101 to S108.

In step S101, the main contact MC is disconnected from the first static contact A.

In step S102, the first trigger contact S2 is disconnected from the first static contact A.

In step S103, the first auxiliary contact S1 is disconnected from the first static contact A, and is connected to the second static contact B.

In step S104, the first trigger contact S2 is connected to the second static contact B.

In step S105, the second trigger contact S4 is disconnected from the first static contact A.

In step S106, the main contact MC is connected to the second static contact B.

In step S107, the second auxiliary contact S3 is disconnected from the first static contact A, and is connected to the second static contact B.

In step S108, the second trigger contact S4 is connected to the second static contact B.

Figure 3:
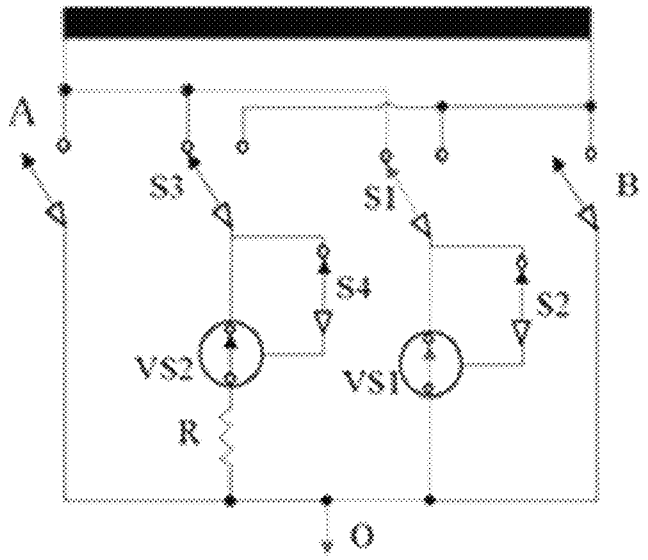
FIG. 3 is a circuit diagram of a power electronic tap changer device according to a second embodiment of the present disclosure.

Specifically, in step S101, referring to FIG. 3, the main contact MC is disconnected from the first static contact A, a voltage difference is generated between two terminals of the first thyristor VS1, so that the first thyristor VS1 is conducted. The load current flows through an S1-VS1 branch. In this step, the second thyristor VS2 is also conducted, however due to that the second thyristor VS2 is connected in series with the fifth resistor TR5, the load current flows through a VS1 branch.

Figure 4:
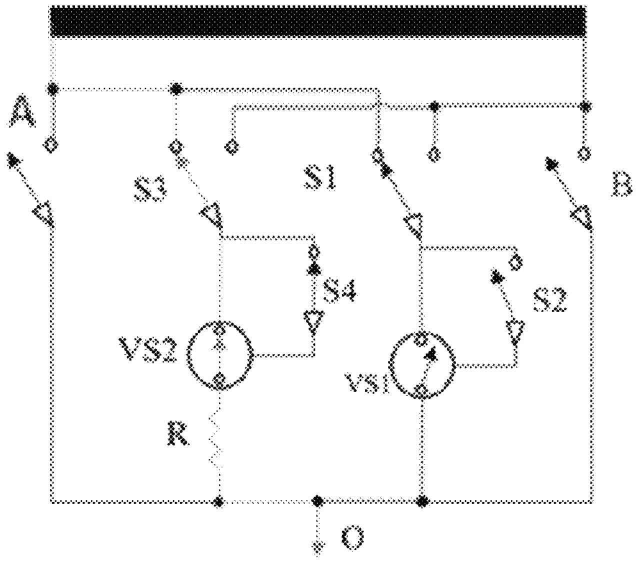
FIG. 4 is a circuit diagram of a power electronic tap changer device according to a third embodiment of the present disclosure.

Specifically, in step S102, referring to FIG. 4, the first trigger contact S2 is disconnected from the first static contact A, the first thyristor VS1 is disconnected, and the load current flows through an S3-VS2-TR5 branch.

Figure 5:
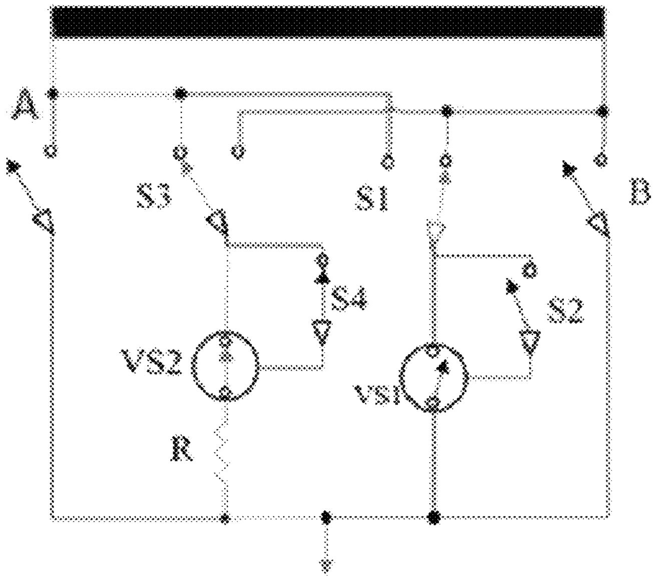
FIG. 5 is a circuit diagram of a power electronic tap changer device according to a fourth embodiment of the present disclosure.

Specifically, in step S103, referring to FIG. 5, the first auxiliary contact S1 is disconnected from the first static contact A, and is connected to the second static contact B.

Figure 6:
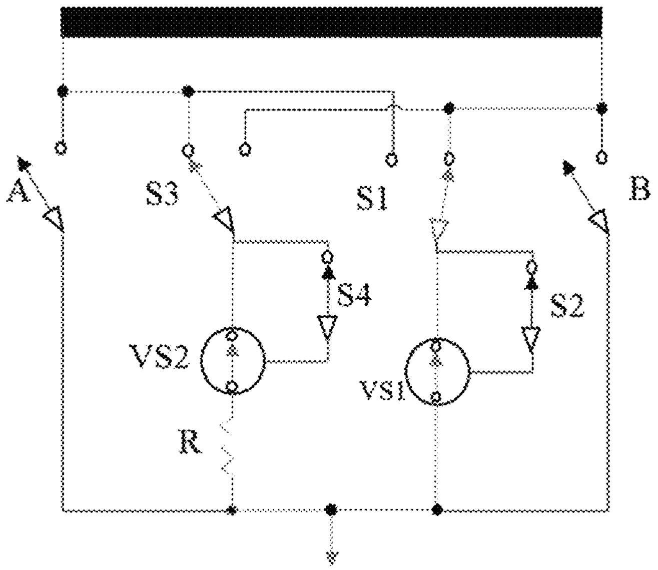
FIG. 6 is a circuit diagram of a power electronic tap changer device according to a fifth embodiment of the present disclosure.

Specifically, in step S104, referring to FIG. 6, the first trigger contact S2 is connected to the second static contact B. Thus, the first thyristor VS1 is conducted, and the load current flows through the S3-VS2-TR5 branch and the S1-VS1 branch. Since VS1 and VS2 are respectively connected to the static contacts B and A, a circulating current is generated in the circuit due to a voltage difference between the two static contacts.

Figure 7:
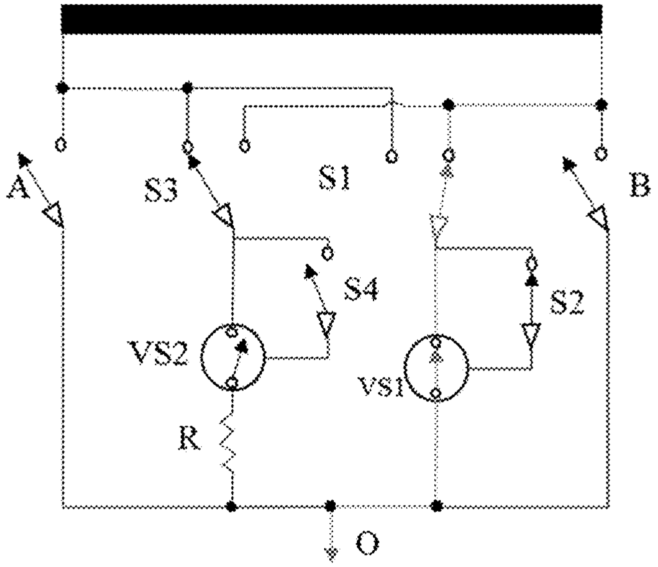
FIG. 7 is a circuit diagram of a power electronic tap changer device according to a sixth embodiment of the present disclosure.

Specifically, in step S105, referring to FIG. 7, the second trigger contact S4 is disconnected from the first static contact A, then the second thyristor VS2 is disconnected, and the load current flows through an S1-VS1 branch.

Figure 8:
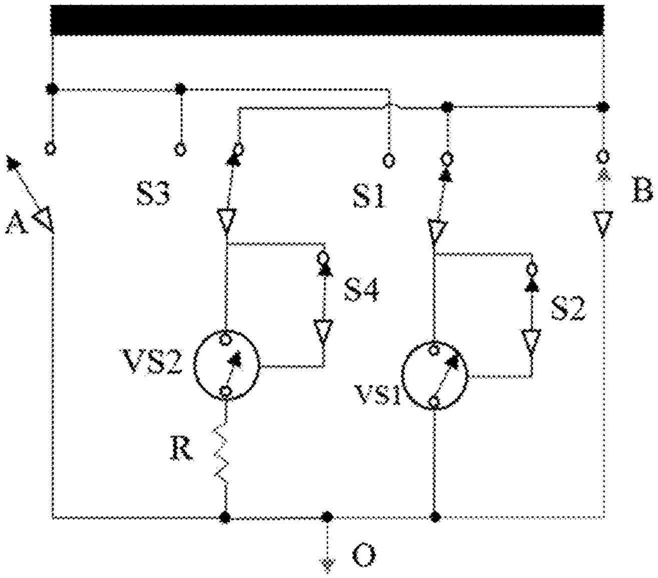
FIG. 8 is a circuit diagram of a power electronic tap changer device according to a seventh embodiment of the present disclosure.

Specifically, in steps S106 and S107, referring to FIG. 8, the main contact MC is connected to the second static contact B, the first thyristor VS1 is short circuited, and the first thyristor VS1 is disconnected. The second auxiliary contact S3 is disconnected from the first static contact A and is connected to the second static contact B, and the second trigger contact S4 is connected to the second static contact B, the second thyristor VS2 is short circuited, the second thyristor VS2 is disconnected, so that the load current flows through a B branch. Thus, the main contact MC, the first auxiliary contact S1, the second auxiliary contact S3, the first trigger contact S2 and the second trigger contact S4 are disconnected from the first static contact A and are connected to the second static contact B.

Compared to the conventional technology, with the power electronic tap changer device according to the present disclosure, passive triggering is performed on thyristors in the switching process of the tap changer, increasing circuit reliability and reducing the cost.

According to another embodiment of the present disclosure, a contact device for a passive triggered power electronic tap changer is provided. The contact device is suitable for the power electronic tap changer device according to the above embodiments.

The contact device includes: at least two static contacts, a main contact, two thyristor trigger contacts, two thyristor auxiliary contacts and a drive shaft. The at least two static contacts are arc-shaped conductive sheets with a same radius, and are distributed on a circumference with the drive shaft as a center to form a cylindrical structure around the drive shaft. The main contact, the two thyristor trigger contacts and the two thyristor auxiliary contacts are connected to the drive shaft to rotate with the drive shaft, and are in sliding contact with the static contact. The two thyristor trigger contacts rotate in a same rotation track, and the two thyristor auxiliary contacts rotate in a same rotation track. An area of a static contact contacting the main contact is recorded as a first part, each of areas of the static contact contacting the two thyristor trigger contacts is recorded as a second part, and each of areas of the static contact contacting the two thyristor auxiliary contacts is recorded as a third part. The first part is less than the second part in length, and the second part is less than the third part in length. The first part, the second part and the third part of each of the at least two static contacts are distributed on the circumference with the drive shaft as the center.

Figure 9:
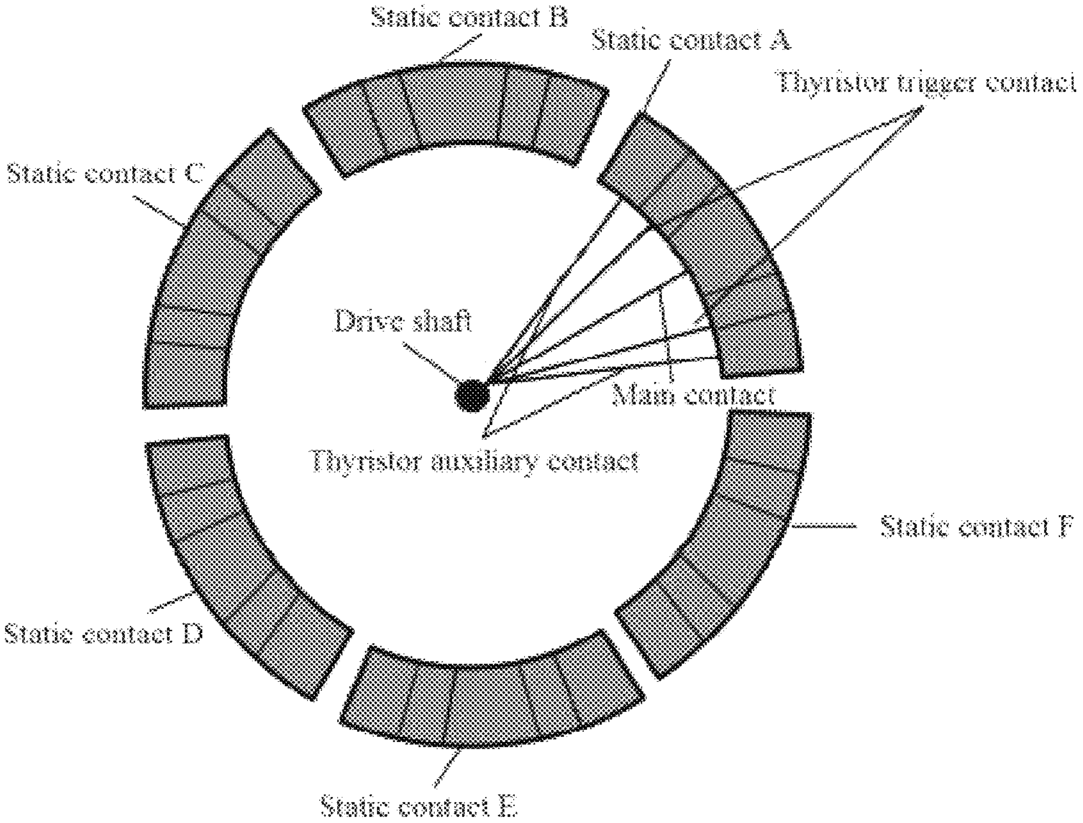
FIG. 9 is a schematic structural diagram of a contact device for a passive triggered power electronic tap changer according to a preferred embodiment of the present disclosure.

In implementing the embodiment, referring to FIG. 9, which is a schematic structural diagram of a contact device for a passive triggered power electronic tap changer according to a preferred embodiment of the present disclosure. The contact devices includes six static contacts: a static contact A, a static contact B, a static contact C, a static contact D, a static contact E and a static contact F. The six static contacts are arc-shaped conductive sheets with a same radius. The six static contacts are distributed on a circumference with the drive shaft as a center and have a same radius.

The main contact, the two thyristor trigger contacts and the two thyristor auxiliary contacts are connected to the drive shaft to rotate with the drive shaft to contact with the six static contacts.

It should be noted that, in the embodiment, the number of the static contacts is 6, and the number of the static contacts may be configured in other embodiments according to practical requirements.

In a case of the number of the static contacts is two, the contact device for a passive triggered power electronic tap changer according to the embodiment is applicable for the power electronic tap changer device according to the above embodiments.

Figure 10:
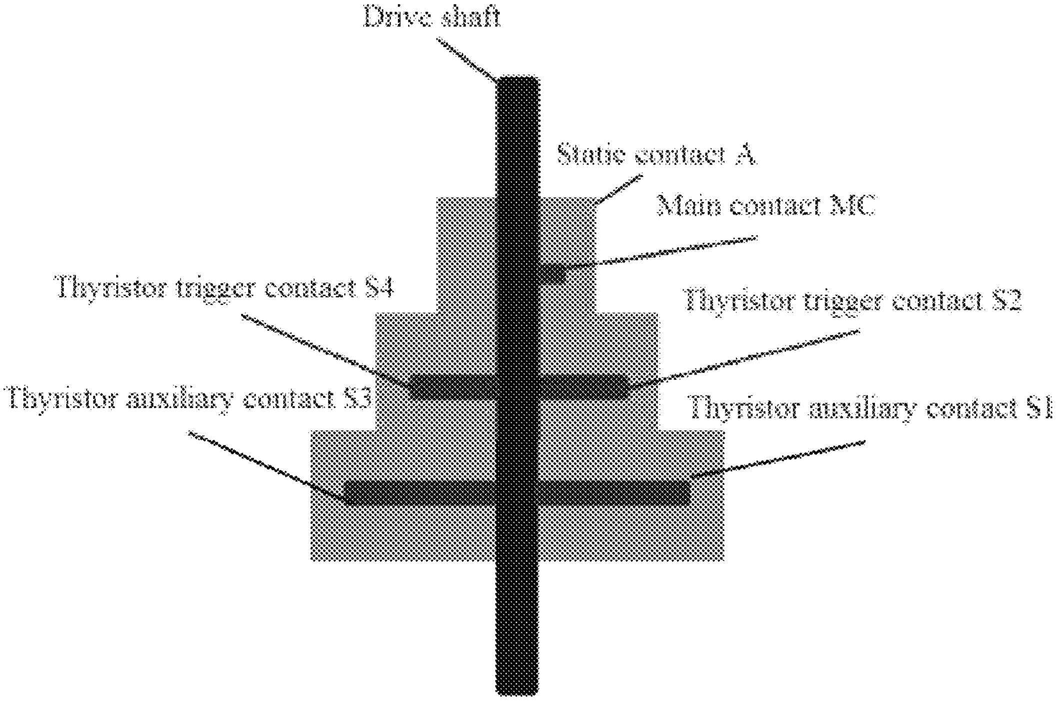
FIG. 10 is a schematic structural diagram of a contact device for a passive triggered power electronic tap changer according to another preferred embodiment of the present disclosure.

Reference is made to FIG. 10, which is a schematic structural diagram of a contact device for a passive triggered power electronic tap changer according to another preferred embodiment of the present disclosure. As shown in FIG. 10, the main contact MC, the thyristor trigger contact S2, the thyristor trigger contact S4, the thyristor auxiliary contact S1 and the thyristor auxiliary contact S3 are connected to the drive shaft. The thyristor trigger contact S2 and the thyristor trigger contact S4 are fixed on the drive shaft at a same height, so that the thyristor trigger contact S2 and the thyristor trigger contact S4 rotate around the drive shaft in a same rotation track. The thyristor auxiliary contact S1 and the thyristor auxiliary contact S3 are fixed on the drive shaft at a same height, so that the thyristor auxiliary contact S1 and the thyristor auxiliary contact S3 rotate around the drive shaft in a same rotation track. The main contact MC, the two thyristor trigger contacts S2/S4, and the two thyristor auxiliary contacts S1/S3 are respectively fixed on the drive shaft at different heights, so that three different tracks are formed by the main contact MC, the two thyristor trigger contacts S2/S4 and the two thyristor auxiliary contacts S1/S3 that contact with the static contact A and rotate around the drive shaft.

The static contact A includes a first part contacting the main contact, a second part contacting the two thyristor trigger contacts, and a third part contacting the two thyristor auxiliary contacts. The first part is less than the second part in length, and the second part is less than the third part in length. The three parts of the static contact A are symmetrically distributed with reference to a center line. The sequence of the positions of the three parts arranged on the drive shaft is random, thus forming static contacts with different structures. However, the sequences of the positions of the three parts of all the static contacts are the same.

The positions of the first part, the second part and the third part of the static contact respectively correspond to the positions of the main contact, the thyristor trigger contacts and the thyristor auxiliary contacts.

It should be noted that the structure of the contact device according to the embodiment is described based on a structure of the static contact in which the first part is arranged at a top position, the second part is arranged at a middle position, and the third part is arranged at a bottom position. However, a first part, a second part and a third part of a static contact may be arranged in different position sequences. Different position sequences of a first part, a second part and a third part of a static contact correspond to different positions of the main contact, the thyristor trigger contacts and the thyristor auxiliary contacts. After the positions of the main contact, the thyristor trigger contacts and the thyristor auxiliary contacts are determined, the position sequence of all the static contacts should be configured consistently and correspondingly, which is not repeated herein.

It should be noted that in the embodiments of the present disclosure, the first part, the second part and the third part of the static contact have a same thickness and have a same distance from the drive shaft, then the main contact, the thyristor trigger contacts and the thyristor auxiliary contacts have a same lengths. However, in other embodiments, the first part, the second part and the third part of the static contact may have different thicknesses and may have different distances from the drive shaft, then it is required to control the lengths of the main contact, the thyristor trigger contacts and the thyristor auxiliary contacts to ensure that the main contact, the thyristor trigger contacts and the thyristor auxiliary contacts respectively contact with the three parts of the static contact. The implementation principle in the other embodiments is consistent with the implementation principle in the embodiment, and is not repeated herein.

It should be noted that in the embodiment, only the lengths of the three parts of the static contact are defined, and the widths of the three parts are not limited. In practical implementation, the widths of the three parts may be configured according to actual requirements. The widths of the three parts may be the same or different, having no impact on implementation of the solutions.

Figure 11:
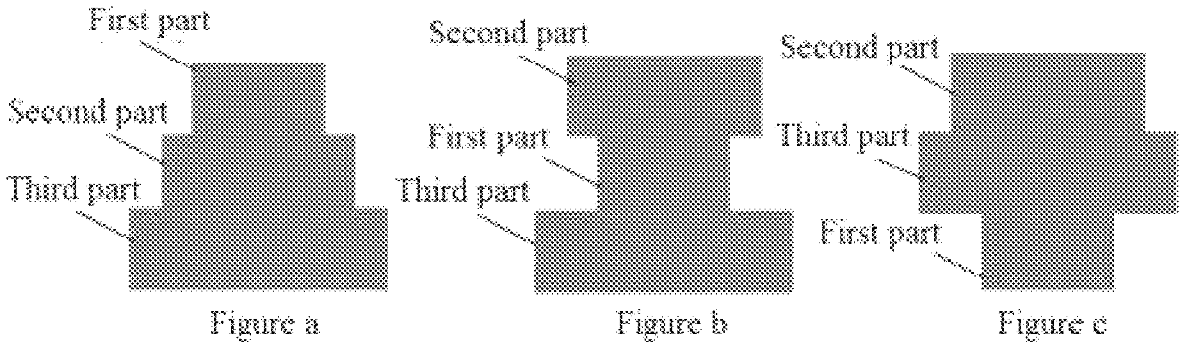
FIG. 11 is a schematic structural diagram of a static contact of a contact device for a passive triggered power electronic tap changer according to some preferred embodiments of the present disclosure.

Reference is made to FIG. 11, which is a front view of a static contact of a contact device for a passive triggered power electronic tap changer according to some preferred embodiments of the present disclosure. In FIG. 11, Figure a, Figure b and Figure c are schematic structural diagrams of a static contact according to three preferred embodiments. In the structure of the static contact shown in Figure a, the second part is arranged at a middle position, the first part is arranged at a position above the second part, and the third part is arranged at a position below the second part. In the structure of the static contact shown in Figure b, the first part is arranged at a middle position, the second part is arranged at a position above the first part, and the third part is arranged at a position below the first part. In the structure of the static contact shown in Figure c, the third part is arranged at a middle position, the second part is arranged at a position above the third part, and the first part is arranged at a position below the third part. In a case that a position sequences of the three parts of a static contacts is different, the positions of the main contact, the thyristor trigger contacts and the thyristor auxiliary contacts respectively correspond to the first part, the second part and the third part of the static contact.

It should be noted that although schematic structural diagrams of three types of static contacts are provided in the embodiment, the static contact may have other structures in other embodiments. The principle of the other structures is consistent with the principle in the embodiment, is within the protection scope of the embodiment, and is not repeated herein.

The contact device for a passive triggered power electronic tap changer according to the present disclosure includes: at least two static contacts, a main contact, two thyristor trigger contacts, two thyristor auxiliary contacts, and a drive shaft. The at least two static contacts are distributed on a circumference with the drive shaft as a center. The main contact, the two thyristor trigger contacts and the two thyristor auxiliary contacts are connected to the drive shaft, and are contact with different parts of the at least two static contacts along with the drive shaft. The main contact contacts a first part of a static contact, the thyristor trigger contacts contact a second part of the static contact, and the thyristor auxiliary contacts contact a third part of the static contact. The lengths of the three parts are configured, so that the main contact, the two thyristor trigger contacts and the two thyristor auxiliary contacts rotate under the drive of the drive shaft to respectively contact different parts of different static contacts. With the contact device, it is controlled to switch to perform passive triggering on the power electronic tap changer with the rotation of the drive shaft, realizing a stable switching process which is easy to be controlled and reducing the device cost.

In another embodiment according to the present disclosure, an initial position of the main contact is located between an edge line of a first part of a first static contact and a center line of the first static contact. The first static contact is one of the at least two static contacts. A distance between the main contact and a first edge line closest to the main contact is a first distance. The first edge line is located at an edge of the first part and the edge is parallel to the center line of the first static contact.

Initial positions of the two thyristor trigger contacts are symmetrically distributed on two sides of a center line of a second part of the first static contact. A distance between one of the two thyristor trigger contacts and a second edge line closest to the thyristor trigger contact is a second distance. The second edge line is located at an edge of the second part and the edge is parallel to the center line of the second part.

Initial positions of the two thyristor auxiliary contacts are symmetrically distributed on two sides of a center line of a third part of the first static contact. A distance between one of the two thyristor auxiliary contacts and a third edge line closest to the thyristor auxiliary contact is a third distance. The third edge line is located at an edge of the third part and the edge is parallel to the center line of the third part.

The first distance is less than the second distance, and the second distance is less than the third distance.

In another embodiment according to the present disclosure, the first part of the first static contact, the second part of the first static contact and the third part of the first static contact are connected at a same potential.

In another embodiment according to the present disclosure, the main contact, the two thyristor trigger contacts and the two thyristor auxiliary contacts rotate around the drive shaft at a same angular speed.

Figure 12:
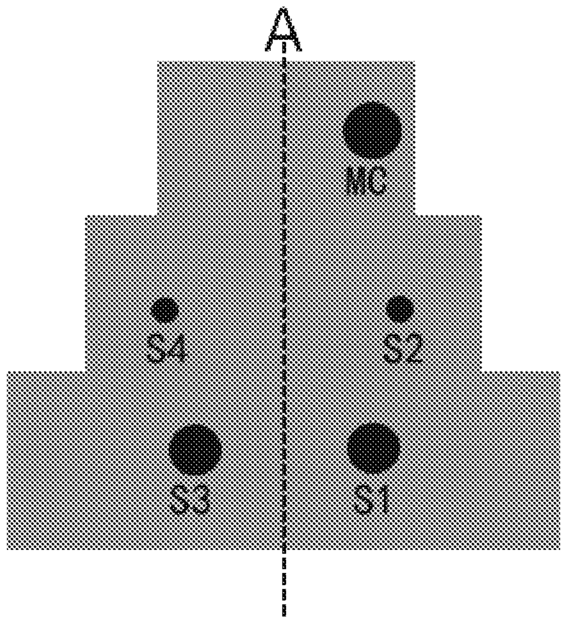
FIG. 12 is a schematic diagram of initial positions of contacts of a contact device for a passive triggered power electronic tap changer according to a preferred embodiment of the present disclosure.

In another embodiment according to the present disclosure, a maximum contact area between the main contact and the static contact is greater than a maximum contact area between each of the thyristor auxiliary contacts and the static contact, and the maximum contact area between each of the thyristor auxiliary contacts and the static contact is greater than a maximum contact area between each of the thyristor trigger contacts and the static contact In implementation, reference is made to FIG. 12, which is a schematic diagram of initial positions of contacts of a contact device for a passive triggered power electronic tap changer according to a preferred embodiment of the present disclosure. In an initial state, a main contact MC contacts a first part of a static contact A, thyristor trigger contacts S2 and S4 contact a second part of the static contact A, and thyristor trigger contacts S1 and S3 contact a third part of the static contact A. At an initial position, it is required for the main contact MC to carry current for a long time. In a switching process, it is required for the thyristor auxiliary contacts S1 and S3 to carry current separately in turn, and it is only required to provide a small triggering current for the thyristor trigger contacts S2 and S4. Therefore, in implementation, a contact area between the static contact A and the main contact MC is greater than a contact area between the static contact A and each of the thyristor auxiliary contacts S3 and S1, and the contact area between the static contact A and each of the thyristor auxiliary contacts S3 and S1 is greater than a contact area between the static contact A and each of the thyristor trigger contacts S2 and S4.

Different current-carrying areas are configured based on current-carrying strengths of different contacts, reducing the manufacturing cost while ensuring a stability and safety switching process.

In the embodiment, the initial position of the main contact MC is located between an edge line of a first part of the static contact A and the center line, and a distance between the main contact MC and the edge line of the first part is represented by L1; the thyristor trigger contacts S2 and S4 are symmetrically located on two sides of a center line of a second part of the static contact A, and a distance between each of the thyristor trigger contacts S2 and S4 and the edge line of the second part is represented by L2; and the thyristor auxiliary contacts S1 and S3 are symmetrically located on two sides of a center line of a second part of the static contact A, and a distance between each of the thyristor auxiliary contacts S1 and S3 and the edge line of the third part is represented by L3. To ensure that in a switching process, the main contact MC is first disconnected from the static contact A, then the thyristor trigger contact S2 is disconnected from the static contact A, and finally the thyristor auxiliary contact S1 is disconnected from the static contact A, L1 should be less than L2 and L2 should be less than L3.

The main contact, the thyristor trigger contacts and the thyristor auxiliary contacts are connected to the drive shaft to rotate around the drive shaft at a same angular speed. Thus, the main contact, the thyristor trigger contacts and the thyristor auxiliary contacts contact different static contacts in a same sequence, thereby ensuring the switching sequence of the tap changer is unchanged.

For each of static contacts, a first part, a second part and a third part are connected at a same potential. Potentials of different static contacts may be different. The main contact, the thyristor trigger contacts and the thyristor auxiliary contacts contact different static contacts, so that the tap changer switches between different static contact potentials.

The initial positions of the main contact, the thyristor trigger contacts and the thyristor auxiliary contacts of the tap changer are configured, and the main contact, and the thyristor trigger contacts and the thyristor auxiliary contacts of the tap changer rotate at the same angular speed around the drive shaft to contact different static contacts, thereby meeting the requirement of the passive triggered power electronic tap changer for the switching sequence and meeting the requirement of the tap changer for voltages.

In implementing the present disclosure, as shown in FIG. 1, the circuit includes: a static contact A, a static contact B, a main contact MC, a thyristor VS1, a thyristor VS2, a thyristor auxiliary contact S3, a thyristor auxiliary contact S1, a thyristor trigger contact S2, a thyristor trigger contact S4, a resistor R, a first resistor TR1, a second resistor TR2, a third resistor TR3 and a fourth resistor TR4. The static contact A is adjacent to the static contact B. The connection relationship of the tap changer in an initial state is shown in FIG. 1, in which the static contact B is suspended, the static contact A is connected to the output terminal O via the main contact MC, the thyristor auxiliary contact S1 is connected to the first terminal of the thyristor VS1, the second terminal of the thyristor VS1 is connected to the output terminal O via the resistor R, the thyristor auxiliary contact S2 is connected to the first terminal of the thyristor VS2, the second terminal of the thyristor VS2 is connected to the output terminal O, one terminal of the thyristor trigger contact S2 is connected to the static contact A, another terminal of the thyristor trigger contact S2 is connected to the first terminal of the first resistor TR1, the second terminal of the first resistor TR1 is connected to the first terminal of the second resistor TR2 and the trigger terminal of the thyristor VS1, the second terminal of the resistor TR2 is connected to the output terminal O, one terminal of the thyristor trigger contact S4 is connected to the static contact A, another terminal of the thyristor trigger contact S4 is connected to the first terminal of the third resistor TR3, the second terminal of the third resistor TR3 is connected to the first terminal of the fourth resistor TR4 and the trigger terminal of the thyristor VS1, and the second terminal of the fourth resistor TR4 is connected to the output terminal O.

Figure 13:
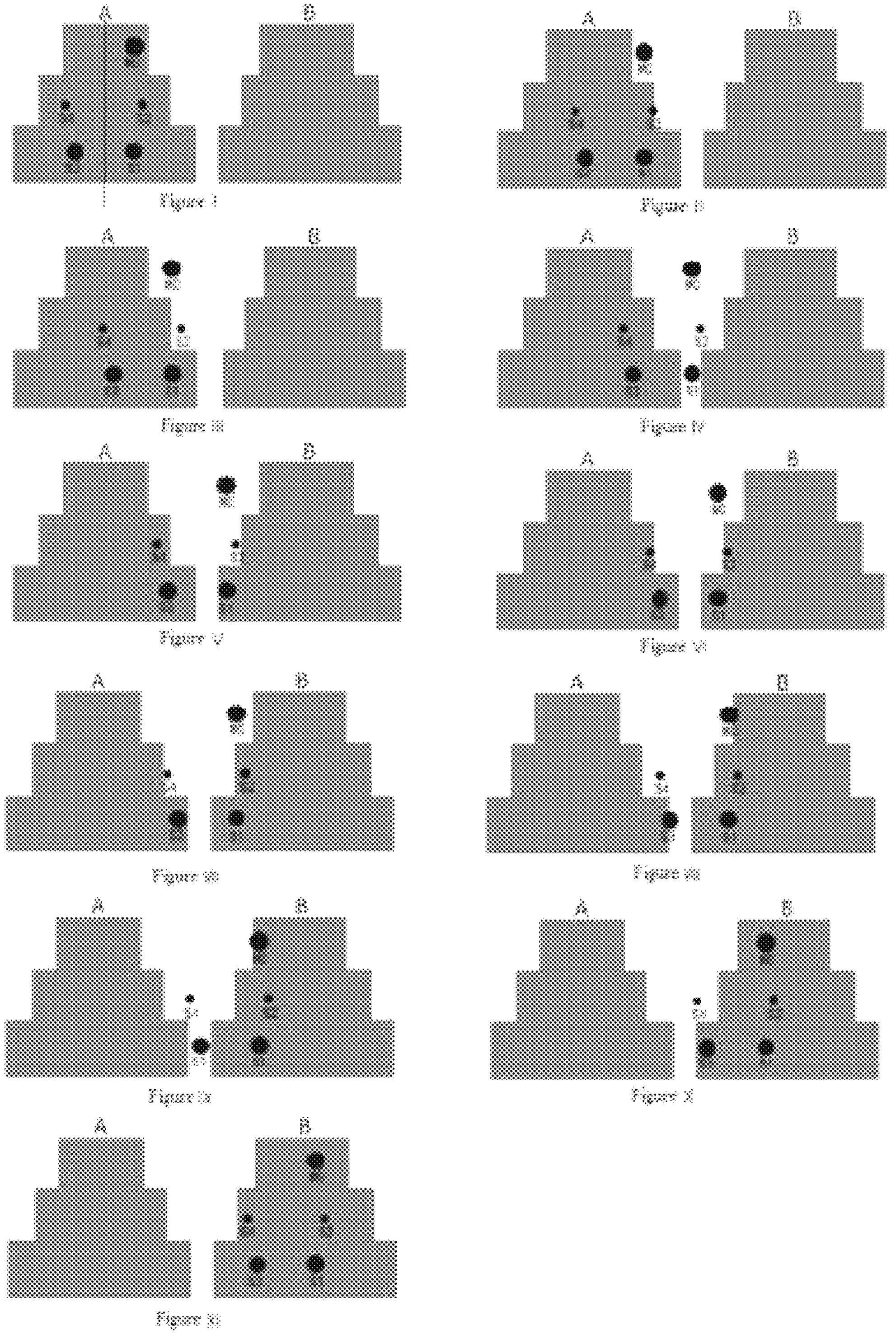
FIG. 13 is a schematic diagram of a switching sequence of a contact device for a passive triggered power electronic tap changer according to another preferred embodiment of the present disclosure.

Reference is made to FIG. 13, which is a schematic diagram of a switching sequence of a contact device for a passive triggered power electronic tap changer according to another preferred embodiment of the present disclosure. The switching sequence of the power electronic tap changer for passive triggering includes:

- connecting MC, S1, S2, S3, and S4, respectively at initial positions, to a contact A, as shown in Figure I;
- disconnecting the main contact MC from the static contact A, as shown in Figure II;
- disconnecting the thyristor trigger contact S2 from the static contact A, as shown in Figure III;
- disconnecting the thyristor auxiliary contact S1 from the static contact A, as shown in Figure IV;
- connecting the thyristor auxiliary contact S1 to a static contact B, as shown in Figure V; connecting the thyristor trigger contact S2 to the static contact B, as shown in Figure VI;
- disconnecting the thyristor trigger contact S4 from the static contact A, as shown in Figure VII;
- connecting the main contact MC to the static contact B, as shown in Figure VIII;
- disconnecting the thyristor auxiliary contact S3 from the static contact A, as shown in Figure IX;
- connecting the thyristor auxiliary contact S3 to the static contact B, as shown in Figure X; and
- connecting the thyristor trigger contact S4 to the static contact B, as shown in Figure XI.

After performing a switching process according to the above switching sequence, the tap changer is switched from the static contact A to the static contact B. A switching process from the static contact B to a static contact C adjacent to the static contact B is the same as the above switching process from the static contact A to the static contact B, and is not repeated herein.

A contact device for a passive triggered power electronic tap changer is provided according to the embodiments of the present disclosure. The contact device includes: at least two static contacts, a main contact, two thyristor trigger contacts, two thyristor auxiliary contacts, and a drive shaft. The at least two static contacts are distributed on a circumference with the drive shaft as a center. The main contact, the two thyristor trigger contacts and the two thyristor auxiliary contacts are fixed on the drive shaft, and contact different parts of the at least two static contacts along with the drive shaft. The main contact contacts a first part of a static contact, the thyristor trigger contacts contact a second part of the static contact, and the thyristor auxiliary contacts contact a third part of the static contact. The lengths of the three parts of the static contacts are configured, and the initial positions and the angular speeds of the main contact, the two thyristor trigger contacts and the two thyristor auxiliary contacts are configured, so that the main contact, the two thyristor trigger contacts and the two thyristor auxiliary contacts rotate under the drive of the drive shaft to respectively contact different parts of different static contacts in a certain sequence. With the contact device, the drive shaft is controlled to rotate, so that the power electronic tap changer is switched between different static contacts in a predetermined switching sequence, thereby realizing a stable switching process which is easy to be controlled and reducing the device cost.

According to the present disclosure, a passive triggered power electronic tap changer device and a contact device are provided. The power electronic tap changer device includes: two taps, a main contact, two auxiliary contacts, two trigger contacts, an output terminal, two thyristors, and four voltage dividing resistors. The auxiliary contacts and the trigger contacts are controlled, so that passive triggering is performed on the power electronic tap changer, increasing circuit reliability and reducing the cost. According to the present disclosure, a contact device for a power electronic tap changer is provided. The contact device for a power electronic tap changer includes: at least two static contacts, a main contact, two thyristor trigger contacts, two thyristor auxiliary contacts and a drive shaft. The main contact, the thyristor trigger contacts and the thyristor auxiliary contacts are fixed on the drive shaft. With the contact device, the power electronic tap changer is controlled to switch to different static contacts with the rotation of the drive shaft, and the switching sequence of passive triggering is maintained, realizing a stable switching process which is easy to be controlled and reducing the device cost.

It should be noted that the device embodiments described above are merely illustrative, and the units described as separate components may be or may not be physically separated. The components shown as units may be or may not be physical units, and may be located in one place or may be distributed to multiple network units. Part or all of the modules may be selected according to practical requirements to achieve the purpose of the solutions in the embodiments. In addition, in the drawings of the device embodiments according to the present disclosure, the connection relationship between modules indicates that the modules have communication connections, which may be implemented as one or more communication buses or signal lines. The device embodiments can be understood and implemented by those skilled in the art without creative efforts.

The above descried embodiments are preferred embodiments of the present disclosure. It should be noted those skilled in the art may make improvements and modifications without departing from the principle of the present disclosure, and these improvements and modifications are within the protection scope of the present disclosure.

The invention claimed is:

1. A power electronic tap changer device, comprising: a first tap, a second tap, a main contact, a first auxiliary contact, a second auxiliary contact, a first trigger contact, a second trigger contact, an output terminal, a first thyristor, a second thyristor, a first resistor, a second resistor, a third resistor and a fourth resistor, wherein the main contact, the first auxiliary contact, the second auxiliary contact, the first trigger contact and the second trigger contact are respectively connected to a first static contact of the first tap or a second static contact of the second tap;

the main contact is connected to the output terminal;

the first auxiliary contact is connected to a terminal of the first thyristor, and the output terminal is connected to another terminal of the first thyristor;

the second auxiliary contact is connected to a terminal of the second thyristor, and the output terminal is connected to another terminal of the second thyristor;

the first trigger contact is connected to a first terminal of the first resistor, a second terminal of the first resistor is connected to a first terminal of the second resistor, and the output terminal is connected to a second terminal of the second resistor; and the second trigger contact is connected to a first terminal of the third resistor, a second terminal of the third resistor is connected to a first terminal of the fourth resistor, and the output terminal is connected to a second terminal of the fourth resistor.

2. The power electronic tap changer device according to claim 1, further comprising: a fifth resistor, wherein the second thyristor is connected to a first terminal of the fifth resistor, and the output terminal is connected to a second terminal of the fifth resistor.

3. The power electronic tap changer device according to claim 1, wherein in a case that the power electronic tap changer device operates normally, the main contact, the first auxiliary contact, the second auxiliary contact, the first trigger contact and the second trigger contact are all connected to the first static contact.

4. The power electronic tap changer device according to claim 3, wherein in a case that the power electronic tap changer device starts to perform switching, the main contact, the first auxiliary contact, the second auxiliary contact, the first trigger contact and the second trigger contact are controlled to be disconnected from the first static contact and be connected to the second static contact based on a predetermined switching control strategy.

5. The power electronic tap changer device according to claim 4, wherein the switching control strategy comprises:

disconnecting the main contact from the first static contact;

disconnecting the first trigger contact from the first static contact;

disconnecting the first auxiliary contact from the first static contact, and connecting the first auxiliary contact to the second static contact;

connecting the first trigger contact to the second static contact;

disconnecting the second trigger contact from the first static contact;

connecting the main contact to the second static contact;

disconnecting the second auxiliary contact from the first static contact, and connecting the second auxiliary contact to the second static contact; and connecting the second trigger contact to the second static contact.

6. The power electronic tap changer device according to claim 1, wherein the first tap is adjacent to the second tap.

7. A contact device for a passive triggered power electronic tap changer, applicable for the power electronic tap changer device according to claim 1, wherein the contact device comprises: at least two static contacts, a main contact, two thyristor trigger contacts, two thyristor auxiliary contacts, and a drive shaft, wherein the at least two static contacts are arc-shaped conductive sheets with a same radius, and are distributed on a circumference with the drive shaft as a center to form a cylindrical structure around the drive shaft;

the main contact, the two thyristor trigger contacts and the two thyristor auxiliary contacts are connected to the drive shaft to rotate with the drive shaft, and are in sliding contact with the static contact;

the two thyristor trigger contacts is configured to rotate in a same rotation track, and the two thyristor auxiliary contacts is configured to rotate in a same rotation track;

each of the at least two static contacts comprises: a first part contacting the main contact, a second part contacting the two thyristor trigger contacts, and a third part contacting the two thyristor auxiliary contacts, wherein the first part is less than the second part in length, the second part is less than the third part in length, and the first part, the second part and the third part are distributed on the circumference with the drive shaft as the center;

an initial position of the main contact is located between an edge line of a first part of a first static contact and a center line of the first static contact, wherein the first static contact is one of the at least two static contacts, a distance between the main contact and a first edge line closest to the main contact is a first distance, the first edge line is located at an edge of the first part and the edge is parallel to the center line of the first static contact;

initial positions of the two thyristor trigger contacts are symmetrically distributed on two sides of a center line of a second part of the first static contact, wherein a distance between one of the two thyristor trigger contacts and a second edge line closest to the thyristor trigger contact is a second distance, the second edge line is located at an edge of the second part and the edge is parallel to the center line of the second part;

initial positions of the two thyristor auxiliary contacts are symmetrically distributed on two sides of a center line of a third part of the first static contact, wherein a distance between one of the two thyristor auxiliary contacts and a third edge line closest to the thyristor auxiliary contact is a third distance, the third edge line is located at an edge of the third part and the edge is parallel to the center line of the third part; and the first distance is less than the second distance, and the second distance is less than the third distance.

8. The contact device for a passive triggered power electronic tap changer according to claim 7, wherein the first part of the first static contact, the second part of the first static contact and the third part of the first static contact are connected at a same potential.

9. The contact device for a passive triggered power electronic tap changer according to claim 7, wherein the main contact, the two thyristor trigger contacts and the two thyristor auxiliary contacts are configured to rotate around the drive shaft at a same angular speed.

10. The contact device for a passive triggered power electronic tap changer according to claim 7, wherein a maximum contact area between the main contact and the first static contact is greater than a maximum contact area between each of the thyristor auxiliary contacts and the first static contact, and the maximum contact area between each of the thyristor auxiliary contacts and the first static contact is greater than a maximum contact area between each of the thyristor trigger contacts and the first static contact.

* * * * *